United States Patent
He et al.

(10) Patent No.: US 11,867,857 B2
(45) Date of Patent: Jan. 9, 2024

(54) METHOD AND SYSTEM FOR UPDATING A SEISMIC VELOCITY MODEL

(71) Applicant: SAUDI ARABIAN OIL COMPANY, Dhahran (SA)

(72) Inventors: Weiguang He, Beijing (CN); Yubing Li, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 255 days.

(21) Appl. No.: 17/374,597

(22) Filed: Jul. 13, 2021

(65) Prior Publication Data
US 2023/0029642 A1 Feb. 2, 2023

(51) Int. Cl.
  G01V 1/28 (2006.01)
  G01V 1/30 (2006.01)

(52) U.S. Cl.
  CPC ............ G01V 1/282 (2013.01); G01V 1/303 (2013.01); G01V 1/306 (2013.01);
  (Continued)

(58) Field of Classification Search
  CPC ........ G01V 1/282; G01V 1/303; G01V 1/306; G01V 2210/614; G01V 2210/66;
  (Continued)

(56) References Cited

U.S. PATENT DOCUMENTS 9,081,115 B2 * 7/2015 Routh .............. G01V 1/28
10,436,927 B2 * 10/2019 Sun ............... G01V 1/364
(Continued)

FOREIGN PATENT DOCUMENTS

CA  2819165 A1 * 8/2012 ............ G01V 1/282
CN  107843925 A  3/2018
(Continued)

OTHER PUBLICATIONS

Fomel, S., "Local Seismic Attributes", Geophysics, vol. 72, No. 3, Mar. 13, 2007, pp. A29-A33 (5 pages).

*Primary Examiner* — John E Breene
*Assistant Examiner* — Yaritza H Perez Bermudez
(74) *Attorney, Agent, or Firm* — Osha Bergman Watanabe & Burton LLP (57) ABSTRACT

Methods and systems are disclosed for updating a seismic velocity model of a subterranean region of interest. The method includes receiving an observed seismic dataset and a seismic velocity model, and generating a simulated seismic dataset based on the seismic velocity model and the geometry of the observed seismic dataset, wherein each dataset is composed of a plurality of seismic traces. The method further includes determining a transformed observed seismic dataset and a transformed simulated seismic dataset by determining the instantaneous frequency of at least one member of the plurality of observed seismic traces; and at least one member of the plurality of simulated seismic traces. The method still further includes forming an objective function based on the transformed observed seismic dataset and the transformed simulated seismic dataset and determining an updated seismic velocity model based on an extremum of the objective function.

20 Claims, 9 Drawing Sheets

(52) U.S. Cl.
CPC .... *G01V 2210/614* (2013.01); *G01V 2210/66* (2013.01); *G01V 2210/675* (2013.01)

(58) Field of Classification Search
CPC ......... G01V 2210/675; G01V 2210/43; G01V 2210/6222
See application file for complete search history.

(56) References Cited

U.S. PATENT DOCUMENTS

| | | | |
|---|---|---|---|
| 10,578,755 B2 | 3/2020 | Wang et al. | |
| 10,996,372 B2* | 5/2021 | Denli | G06N 3/04 |
| 11,255,995 B2* | 2/2022 | Hu | G01V 1/282 |
| 11,269,097 B2* | 3/2022 | Wu | G01V 1/303 |
| 11,467,302 B1* | 10/2022 | Diallo | G01V 1/288 |
| 2010/0088035 A1* | 4/2010 | Etgen | G01V 1/30 702/14 |
| 2011/0131020 A1 | 6/2011 | Meng | |
| 2011/0288831 A1* | 11/2011 | Tan | G01V 1/28 703/2 |
| 2013/0054201 A1* | 2/2013 | Posamentier | G01V 99/005 703/2 |
| 2016/0047924 A1 | 2/2016 | Krohn et al. | |
| 2016/0370481 A1* | 12/2016 | Hu | G01V 1/282 |
| 2018/0196154 A1* | 7/2018 | Gomes | G01V 1/282 |
| 2019/0018155 A1* | 1/2019 | Nakshatrala | G01V 1/303 |
| 2019/0302293 A1 | 10/2019 | Zhang et al. | |
| 2020/0309980 A1 | 10/2020 | Wang et al. | |
| 2020/0408943 A1* | 12/2020 | Qin | G01V 1/325 |
| 2021/0049485 A1 | 2/2021 | Blumenfeld | |
| 2021/0063590 A1* | 3/2021 | Cooper | G01V 1/306 |
| 2023/0037886 A1* | 2/2023 | He | G01V 1/303 |

FOREIGN PATENT DOCUMENTS

| | | | | |
|---|---|---|---|---|
| CN | 111239819 A | * | 6/2020 | G01V 1/282 |
| GB | 2411232 A | * | 8/2005 | G01V 1/48 |
| WO | 2015065952 A1 | | 5/2015 | |
| WO | WO-2016036979 A1 | * | 3/2016 | E21B 49/003 |

\* cited by examiner

METHOD AND SYSTEM FOR UPDATING A SEISMIC VELOCITY MODEL

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subterranean, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of updating a seismic velocity model of a subterranean region of interest. The method includes receiving an observed seismic dataset and a seismic velocity model, and generating a simulated seismic dataset based on the seismic velocity model and the geometry of the observed seismic dataset, wherein each dataset is composed of a plurality of seismic traces. The method further includes determining a transformed observed seismic dataset and a transformed simulated seismic dataset by determining the instantaneous frequency of at least one member of the plurality of observed seismic traces; and at least one member of the plurality of simulated seismic traces. The method still further includes forming an objective function based on the transformed observed seismic dataset and the transformed simulated seismic dataset and determining an updated seismic velocity model based on an extremum of the objective function.

In general, in one aspect, embodiments relate to a non-transitory computer readable medium storing instructions executable by a computer processor, the instructions include functionality for receiving an observed seismic dataset, composed of a plurality of observed seismic traces, receiving a seismic velocity model for the subterranean region of interest, and generating a simulated seismic dataset composed of a plurality of simulated seismic traces based on the seismic velocity model and the geometry of the observed seismic dataset. The instructions further include functionality for determining a transformed observed seismic dataset and a transformed simulated seismic dataset by determining the instantaneous frequency of at least one member of the plurality of seismic traces for each dataset. The instructions still further include functionality for forming an objective function based on the transformed observed seismic dataset and the transformed simulated seismic dataset and determining an updated seismic velocity model based on an extremum of the objective function.

In general, in one aspect, embodiments relate to a system for forming an image of a subterranean region of interest. The system includes a seismic source to emit a radiated seismic wave, a plurality of seismic receivers for detecting and recording an observed seismic dataset generated by the radiated seismic wave and a seismic processor. The seismic processor is configured to receive an observed seismic dataset and a seismic velocity model, and generate a simulated seismic dataset based on the seismic velocity model and the geometry of the observed seismic dataset, wherein each dataset is composed of a plurality of seismic traces. The seismic processor is further configured to determine a transformed observed seismic dataset and a transformed simulated seismic dataset by determining the instantaneous frequency of at least one member of the plurality of observed seismic traces and at least one member of the plurality of simulated seismic traces. The seismic processor is still further configured to form an objective function based on the transformed observed seismic dataset and the transformed simulated seismic dataset and determine an updated seismic velocity model based on an extremum of the objective function.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The embodiments disclosed herein disclose a method and system for updating a seismic velocity model of a subterranean region of interest. The method includes determining the instantaneous frequency of a plurality of traces from an observed seismic dataset and of a plurality of traces from a simulated seismic dataset, forming an objective function using the instantaneous frequencies of the observed and simulated seismic traces, and finding an extremum of the objective function. Also disclosed are non-transitory computer readable media containing instruction for executing the disclosed methods and systems for acquiring and processing a seismic survey using the disclosed methods.

Figure 1:
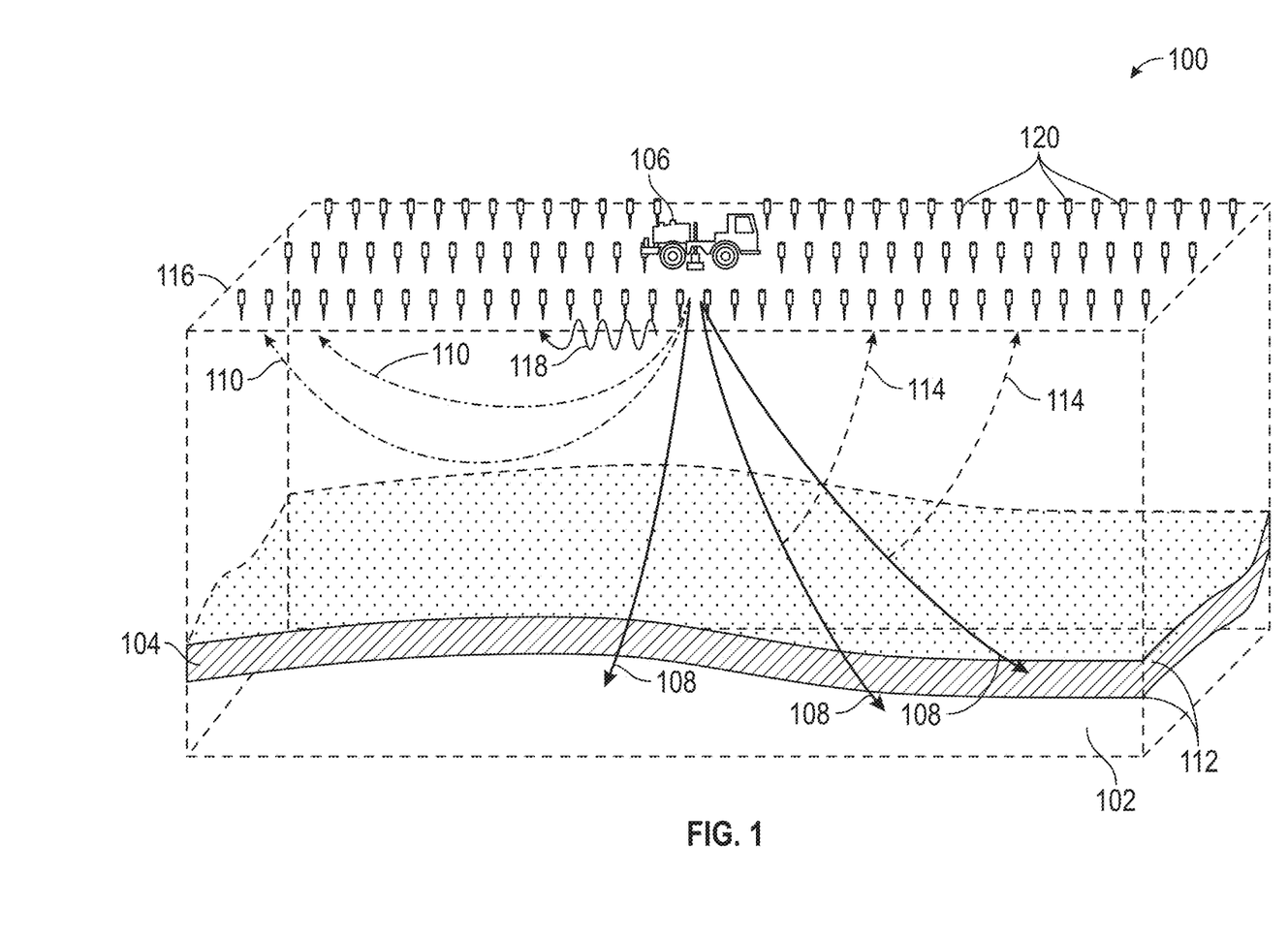
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the Earth's surface (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the Earth's surface (116) and hence are not influenced, nor contain information about, portions of the subterranean region of interest (102) where hydrocarbon reservoirs (104) are typically located. Seismic receivers (120) located on or near the Earth's surface (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote $(x_r, y_r)$ where x and y represent orthogonal axes on the Earth's surface (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (116) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

When a seismic dataset is acquired by activating physical seismic sources and recording the actual resulting vibrations of the Earth using physical seismic receivers, the seismic dataset may be termed an "observed seismic dataset" and the component seismic traces "observed seismic traces". However, a seismic dataset may be simulated by solving the acoustic, elastic, or viscoelastic wave equations for at least one simulated seismic source and a plurality of seismic receiver locations. Typically, the solving is performed using a large capacity computer system. The resulting seismic dataset may be termed a "simulated seismic dataset" and the component seismic traces "simulated seismic traces".

Figure 2:
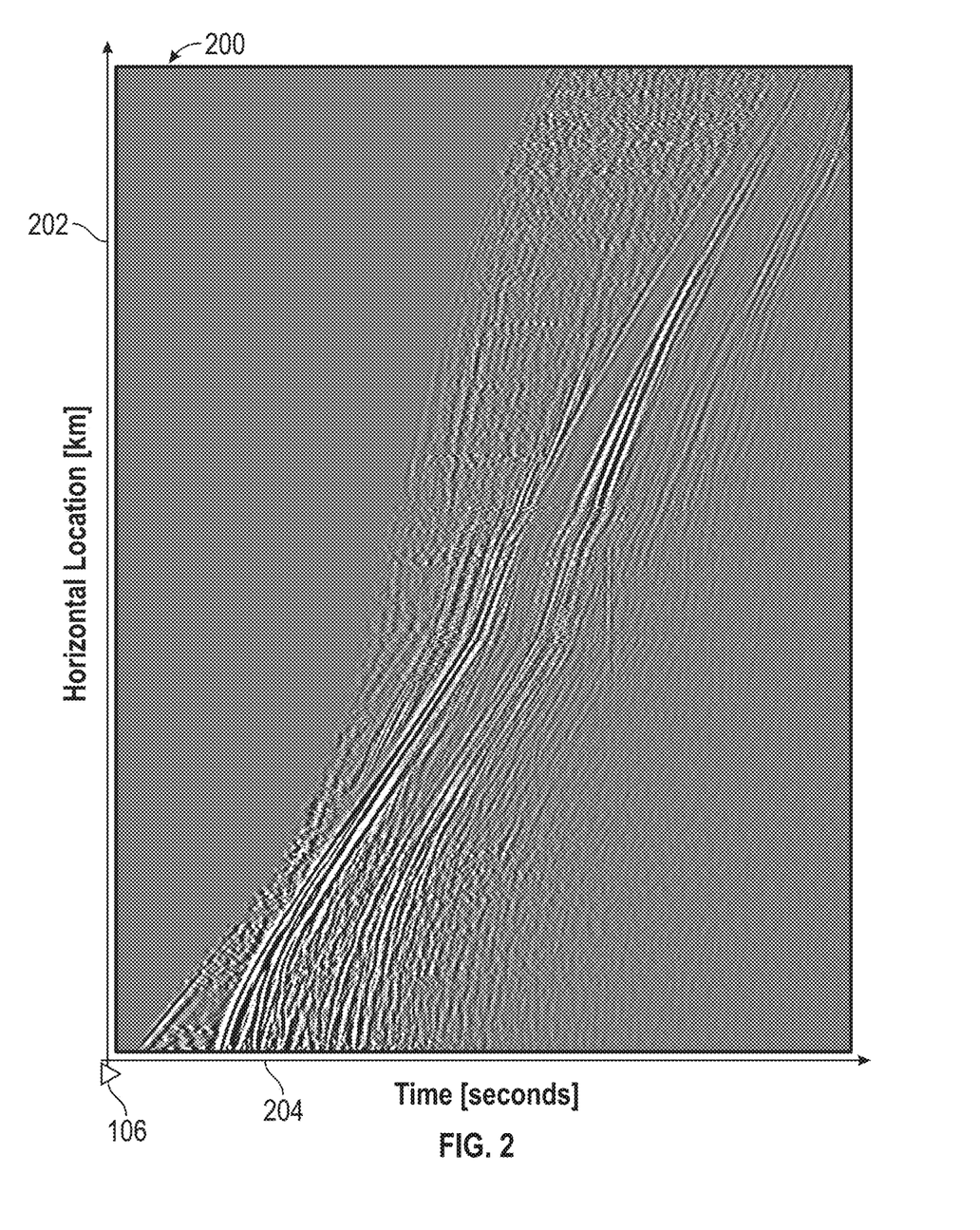
FIG. 2 shows a seismic dataset in accordance with one or more embodiments.

FIG. 2 shows a portion of an observed seismic dataset (200) in accordance with one or more embodiments. The portion of the observed seismic dataset (200) comprises a plurality of seismic traces for a single seismic source (106) activation position. Each seismic trace runs horizontally with the recording time of each sample indicated by the horizontal axis (204). A plurality of seismic traces is displayed. Each seismic trace is displayed at a position on the vertical axis (202) corresponding to the horizontal location of the seismic receiver (120) that recorded the seismic trace. The amplitude of each trace is displayed on a grayscale where in accordance with some embodiments white or a pale gray may represent a large positive amplitude and black or dark gray may represent a large negative amplitude. In accordance with other embodiments, white or a pale gray may represent a large negative amplitude and black or dark gray may represent a large positive amplitude.

Information about the subterranean region of interest, such as its seismic propagation velocity, its reflectivity, and its pore fluid content may influence the characteristics of a seismic trace, including the sample amplitudes. A seismic dataset (200) may be processed or inverted to determine information about the subterranean region including, without limitation, estimating a seismic velocity or an image of geological discontinuities (112) within the subterranean region of interest (102). The geological discontinuities (112) may be boundaries between geological layers, the boundaries between different pore fluids, faults, fractures or groups of fractures within the rock. The geological discontinuities (112) may delineate a hydrocarbon reservoir (104).

Processing a seismic data set comprises a sequence of steps designed, without limitation, to correct for near surface effects, attenuate noise, compensate of irregularities in the seismic survey geometry, calculate a seismic velocity model, image reflectors in the subterranean region, calculate a plurality of seismic attributes to characterize the subterranean region of interest (102), and aid in decisions governing where to drill for hydrocarbons. Processing a seismic dataset (200) may involve combining observed seismic traces (206) drawn from an observed seismic dataset with simulated seismic traces drawn from a simulated seismic dataset.

In accordance with one or more embodiments, a seismic velocity model may be updated by calculating a seismic velocity increment and adding the seismic velocity increment to a pre-existing seismic velocity model to produce an updated seismic velocity model. Both the seismic velocity model and the seismic velocity increment may comprise a seismic velocity value at each of a plurality of locations within the subterranean region of interest (102). The seismic velocity values may change only with depth below the Earth's surface (116) or they may also vary along one or more horizontal spatial axes. The seismic velocity increment may be determined such that a simulated seismic dataset calculated for the resulting updated seismic velocity model matches the observed seismic dataset more closely than does the simulated seismic dataset calculated for the pre-existing seismic velocity model.

The matching of the observed and simulated seismic datasets may be performed, in accordance with one or more embodiments, by forming a plurality of trace pairs with one member of each trace pair being an observed seismic trace drawn from the observed seismic dataset and the other member of the trace pair being a simulated seismic trace drawn from the simulated seismic dataset. Both the observed seismic trace and the simulated seismic trace in each trace pair have the same seismic source (106) location and the same seismic receiver (120) location, i.e., the four-dimensional vector $(x_s, y_s, x_r, y_r)$ is the same for both traces in the trace pair. In accordance with one or more embodiments, we denote the member of the trace pair drawn from the observed seismic dataset, $p_i$, where the subscript i enumerates the trace pair. Similarly, we denote the member of the trace pair drawn from the simulated seismic dataset, $u_i$, so $\{p_i, u_i\}$ denote a trace pair.

The matching of the observed and simulated seismic datasets may be performed, in accordance with one or more embodiments, by first transforming both members of the trace pair $\{p_i, u_i\}$ by applying the same transformation to both members of the trace pair $\{p_i, u_i\}$.

Figure 3:
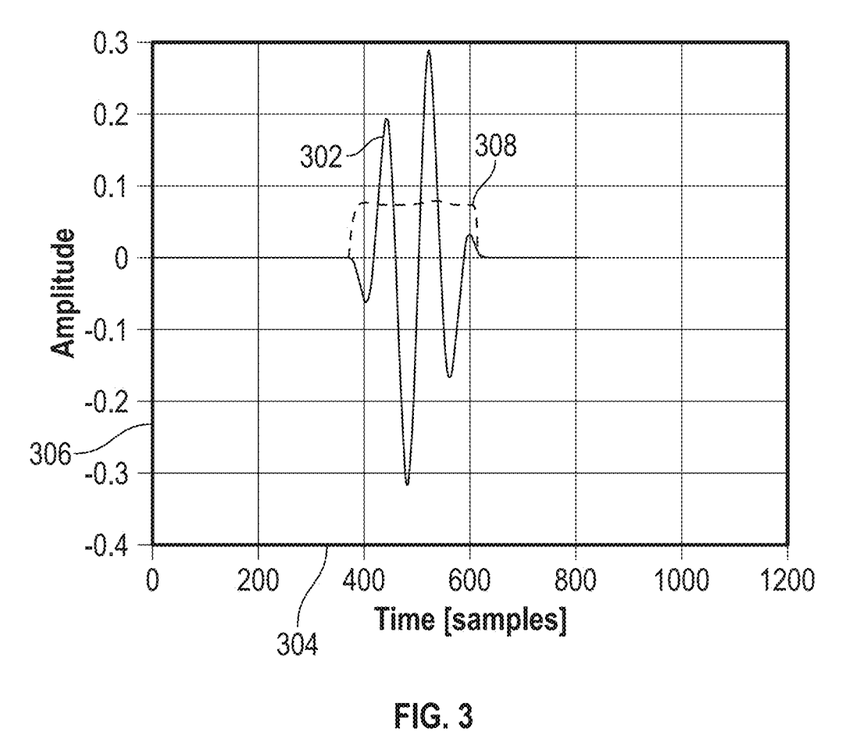
FIG. 3 shows a seismic trace and a transformed seismic trace in accordance with one or more embodiments.

An exemplary seismic trace (302) is depicted in FIG. 3 in accordance with one or more embodiments. The seismic trace (302) represents the vibrations of the earth as a function of time depicted on the horizontal axis (304). The amplitude of the vibrations is depicted on the vertical axis (306). Also depicted in FIG. 3 as a dashed line is the instantaneous frequency (308) of seismic trace (302). The phase, $\varphi(t)$, of a seismic trace, $p(t)$, may be defined through:

$$c(t)=A(t)e^{i\varphi(t)}=p(t)+iq(t) \qquad \text{Equation (1)}$$

where $q(t)=\mathcal{H}(p)$ is the Hilbert transform of $p(t)$, $c(t)$ is the analytic seismic trace, $A(t)$ is the amplitude of the seismic trace, and $\varphi(t)$ is the instantaneous phase.

The instantaneous frequency, $w(t)$, may be defined as:

$$w(t) = \frac{d}{dt}\varphi(t) = \frac{d}{dt}\tan^{-1}\left(\frac{q(t)}{p(t)}\right) = \frac{p\dot{q} - q\dot{p}}{p^2 + q^2}. \qquad \text{Equation (2)}$$

For practical purposes equation (2) is of limited utility as it may give unstable results when the denominator approaches zero. Instead, equation (2) may be written as:

$$d(t)w(t)=n(t) \qquad \text{Equation (3)}$$

where $d(t)=p^2(t)+q^2(t)$ and $n(t)=p(t)\dot{q}(t)-q(t)\dot{p}(t)$ and the overdot "$\dot{x}$" denotes differentiation of x with respect to time.

In discrete form, it is more convenient to write the samples of d, denoted $d_i$, $i=1, \ldots N$, as a diagonal matrix $D_{ij}=\Lambda(d)=\text{diag}(d)$. Equation (3) then becomes:

$$D_{ij}w_j=n_i. \qquad \text{Equation (4)}$$

Both sides of equation (4) may be multiplied by a smoothing matrix $S_{ki}$ to obtain:

$$S_{ki}D_{ij}w_j=S_{ki}n_i. \qquad \text{Equation (5)}$$

and a regularized estimate of the instantaneous frequency may then be obtained by solving the equation:

$$\overline{D}_{kj}w_j=(S_{ki}D_{ij}-\lambda^2 S_{ij}+\lambda^2\delta_{ij})w_j=S_{ki}n_i \qquad \text{Equation (6)}$$

where $\lambda^2$ is a weighting factor and $\delta_{ij}$ is the identity matrix. Equation (6) may be written in matrix notation as:

$$\overline{D}w=Sn \qquad \text{Equation (7)}$$

where $\overline{D}$ and $S$ are matrices and $w$ and $n$ are vectors. The instantaneous frequency vector may then be found by inverting equation (7) giving:

$$w=\overline{D}^{-1}Sn \qquad \text{Equation (8)}$$

The explicit calculation of the inverse matrix $\overline{D}^{-1}$ in equation (8) may be challenging and/or computationally expensive. Instead, equation (7) may be efficiently solved using an iterative numerical algorithm such as the LSQR algorithm, or any one of several other numerical inversion algorithms well known to one of ordinary skill in the art.

Figure 4A:
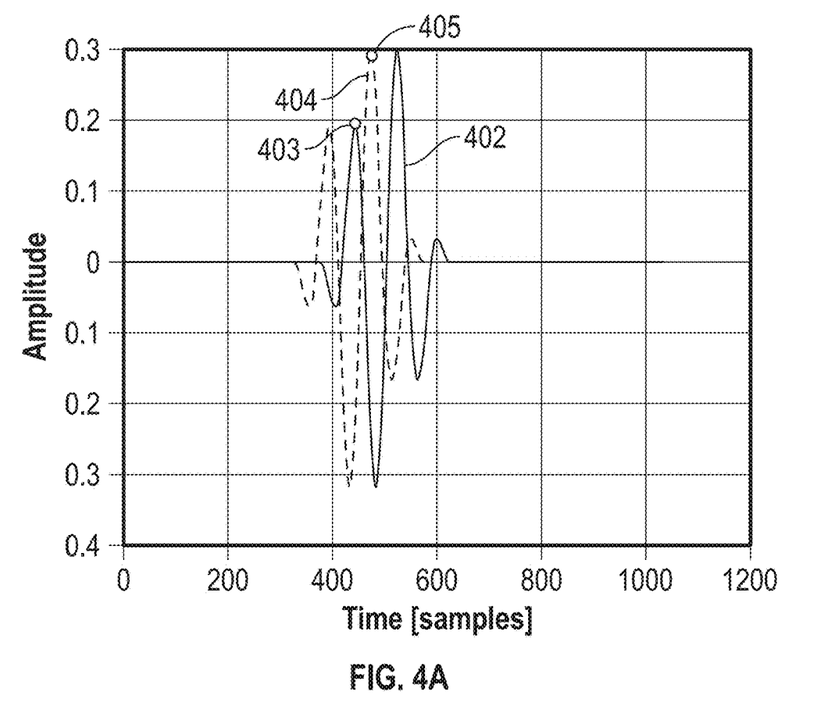
FIGS. 4A and 4B show a seismic traces and objective functions in accordance with one or more embodiments.

In accordance with one or more embodiment, FIG. 4A shows an observed seismic trace (402) and a simulated seismic trace (404) that do not match each other well. The simulated seismic trace (404) is time-shifted when compared to the observed seismic trace (402). In practical circumstances, a time-shift such a that shown in FIG. 4A may occur because the seismic velocity model used to simulate the simulated seismic trace (404) differs from the true seismic velocities within the subterranean region of interest (102). In the example shown, the simulated seismic trace (404) occurs earlier in time than the observed seismic trace (402) and this may be the result of the seismic velocity model containing seismic velocity values that are on average faster than true seismic velocities within the subterranean region of interest (102). Conversely, if the seismic velocity model used for simulation contained seismic velocity values that are on average slower than true seismic velocities the simulated seismic trace (404) may arrive later in time than the observed seismic trace (402).

An objective function, $h_i$, may be formed for each seismic trace pair, $\{p_i, u_i\}$. For example, $h_i$, may be formed based on the least-squares difference between $p_i$ and $u_i$ given by:

$$h_i=\int_0^T(p_i(t)-u_i(t))^2 dt \qquad \text{Equation (9)}$$

and T is the duration of the time window. In accordance with one or more embodiments, the objective function for a combination of all the seismic trace pairs in a seismic dataset may be defined as $h=\Sigma_i h_i$. Equation (9) may be termed a "conventional least-squares objective function".

Figure 4B:
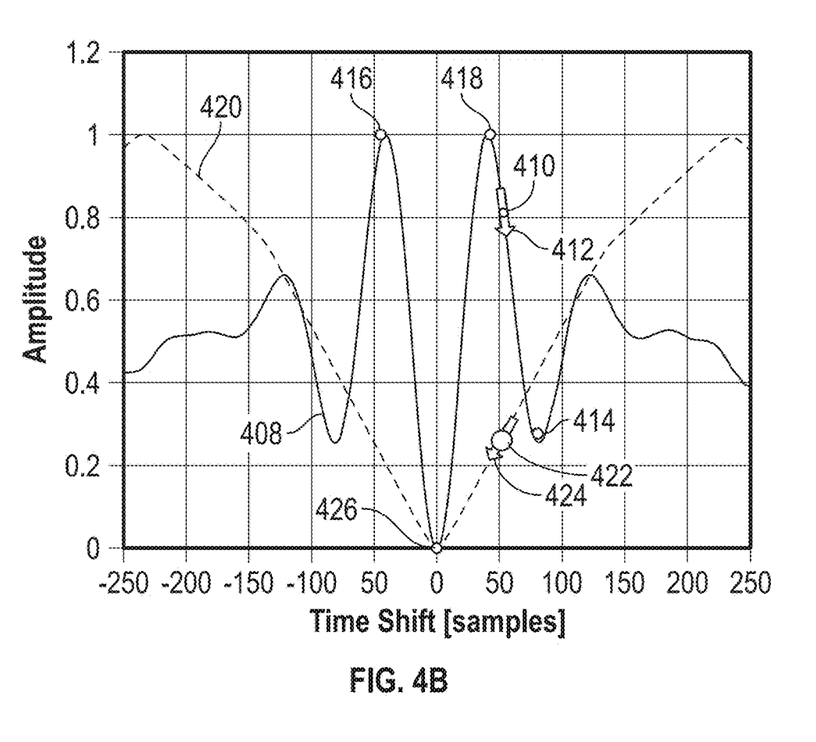

In accordance with one or more embodiments, FIG. 4B shows the conventional least-squares objective function $h_i$ defined in equation (9) for a range of time-shifts between the observed seismic trace (402) and the simulated seismic trace (404) as the solid line (408). The minimum value of $h_i$ (426) occurs where the time-shift between the observed (402) and simulated seismic trace (404) is zero. However, the location of the minimum value of $h_i$ (426) is not known a priori and calculation of the entire objective function for all the seismic pairs is typically computationally infeasible in practical situations.

Instead, only a single value of the conventional least-squares objective function (410) and its gradient or slope (412) is calculated. From this the nearest minimum may be found by iteratively determining a seismic velocity increment to be added to the seismic velocity model, recalculating the value of the conventional least-squares objective function (410) and its gradient or slope (412), and determining a new seismic velocity increment. The iteration terminates when a local minimum (414) is reached. However in the example shown, where there is an initial timeshift of 50 samples, this local extremum (414) does not align, or match, the two members of the trace pair but rather aligns peaks (403, 405) that are offset from one another by one cycle of the seismic trace. This problematic misalignment of the two members of the seismic trace pair is typically known as "cycle-skipping". Cycle-skipping may occur when the members of the seismic trace pairs are insufficiently aligned or matched at the beginning of the iterative process. In the example shown in FIG. 4B, if the time-shift between the seismic trace pair falls between the two maxima with the opposite signs (416, 418) lying on either side of the minimum (426) then the iterative process will converge to the global minimum (326). The range of time-shifts between (416) and (418) may be termed the "basin of attraction". If the time-shift falls outside the basin of attraction, then cycle skipping may occur.

In accordance with one or more embodiments, an objective function may be formed from the instantaneous frequencies of the seismic trace pair. Defining the instantaneous frequency of the observed seismic trace as $w_i^{(p)}$ and the instantaneous frequency of the simulated seismic trace as $w_i^{(u)}$ an objective function may be written as:

$$h_i^{(w)} = \frac{1}{2} < w_i^{(p)} - w_i^{(u)} | w_i^{(p)} - w_i^{(u)} > \quad \text{Equation (10)}$$
$$= \frac{1}{2} \int_0^T \left[ w_i^{(p)}(t) - w_i^{(u)}(t) \right]^2 dt.$$

FIG. 4B shows the value of $h_i^{(w)}$ for a range of time-shifts (420) between the observed and the simulated seismic traces. However, just as for $h_i$, only a single value (422) of the objective function $h_i^{(w)}$ (420) and its gradient or slope (442) may be typically calculated. But, will be readily apparent to one of ordinary skill in the art, through a comparison of $h_i^{(w)}$ (420) and $h_i$ (408), that the basin of attraction of $h_i^{(w)}$ is much wider than the basin of attraction of $h_i$. Thus, using the objective function based upon the instantaneous frequency, $h_i^{(w)}$ (420) will cause the iterative matching of the simulated seismic dataset to the observed seismic dataset by repeated modification of the seismic velocity model to converge to the correct solution even when the initial time-shift between the observed and simulated seismic traces is significantly greater than when the conventional least-squares objective function $h_i$ is used.

The preceding description used a case where the extremum (426) is a minimum of the objective function. However, one of ordinary skill in the art will readily appreciate that the objective function may be formed, for example, by multiplying the exemplary objective function by a negative number, or subtracting the exemplary objective function from a large positive number, so that the extremum is a maximum without departing from the scope of the invention.

In accordance with one or more embodiments, the seismic velocity model increment may be determined using an adjoint source. The adjoint source of any objective function $J=h_i^{(w)}$ may be obtained by determining the first-order perturbation:

$$\delta J_i = <\delta w | \mathcal{D} h_i^{(w)}> \quad \text{Equation (11)}$$

where $\mathcal{D} h_i^{(w)} = \partial h_i^{(w)}/\partial w$ is the first-order differential of $h_i^{(w)}$ with respect to its variable w. Perturbing equation (7) we may obtain:

$$\delta \overline{D} w + \overline{D} \delta w = S \delta n, \quad \text{Equation (12)}$$

and from the definition of $\overline{D}$, we have:

$$\delta \overline{D} w = [S \delta D - \delta \lambda^2 (S - I)] w = S \delta D w. \quad \text{Equation (13)}$$

Combining the definition of D and Equations (11), (12) and (13) gives:

$$\delta J = <\delta n - 2pw\delta p - 2qw\delta q | k> \quad \text{Equation (14)}$$

where we have dropped the subscripts for brevity and $k>=S^T \overline{D}^{-T} | \mathcal{D} h>$ and the superscript T indicates the matrix transpose and −T the inverse of the transposed matrix. Substituting for n gives:

$$\delta J = <(\dot{q}-2wp)\delta p | k> - <(\dot{p}+2wq)\delta q | k> - <q\delta p | k> + <p\delta \dot{q} | k> \quad \text{Equation (15)}$$

Finally, introducing the first-order differential operator with respect to time, $\mathcal{B}$, the adjoint source for a seismic trace pair may be expressed as:

$$|s> = |(\dot{q}-2wp)|k> + \mathcal{H} (\dot{p}+2wq)|k> + \mathcal{B} |qk> + \mathcal{B}\mathcal{H} |p k>. \quad \text{Equation (16)}$$

Figure 5:
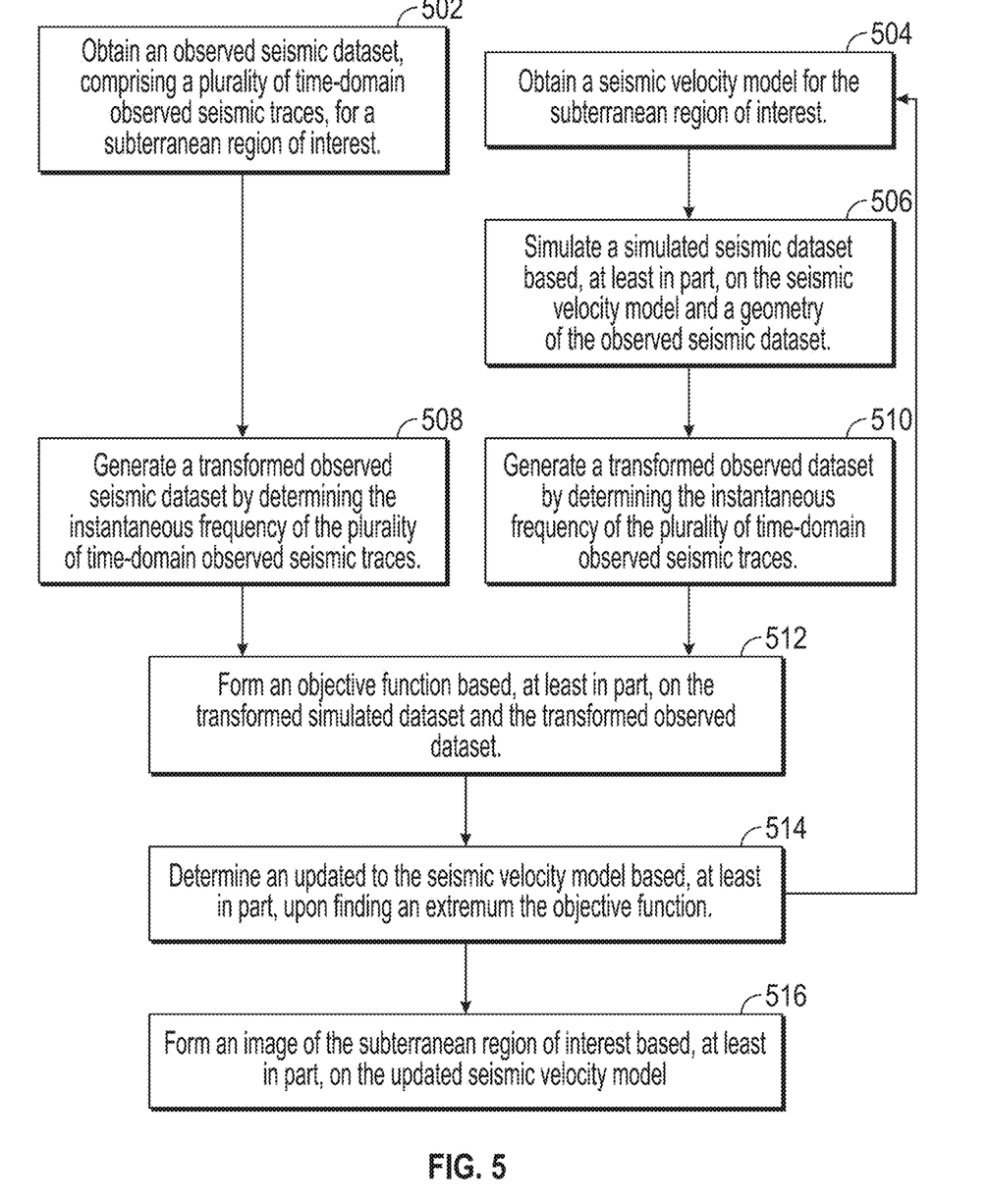
FIG. 5 shows a flowchart in accordance with one or more embodiments. in accordance with one or more embodiments.

FIG. 5 shows a flowchart in accordance with one or more embodiments. In Step 502 an observed seismic dataset (200), comprising a plurality of time-domain observed seismic traces, for a subterranean region of interest (102) is obtained. The observed seismic dataset (200) may contain a plurality of observed seismic traces (206) recorded for each of a plurality of seismic source (106) excitations. Typically, there may be hundreds of thousands of observed seismic traces (206) for each seismic source (106) excitation and tens of thousands of seismic source excitations in an observed seismic dataset (200).

In Step 504 a seismic velocity model for the subterranean region of interest is obtained. The seismic velocity model may be obtained from acoustic well logs or well seismic datasets. The seismic velocity model may be determined from the observed seismic dataset obtained in Step 502 using approximate methods such as normal moveout analysis, Kirchhoff velocity analysis, or seismic velocity tomography. The seismic velocity model may be obtained from another observed seismic dataset for the subterranean region of interest.

In Step 506, a simulated seismic dataset may be simulated based, at least in part, on the seismic velocity model and a geometry of the observed seismic dataset. Simulating the seismic dataset may involve solving the elastic wave equation or an approximation to the elastic for a plurality seismic source (106) locations drawn from the observed seismic dataset and recording the simulated ground motion for a plurality of seismic receiver (120) locations drawn from the observed seismic dataset.

In Step 508, in accordance with one or more embodiments, a transformed observed seismic dataset may be formed by determining the instantaneous frequency of the plurality of time-domain observed seismic traces. The instantaneous frequency of each observed seismic trace may be determined by solving equation (7) or equation (8).

In Step 510, in accordance with one or more embodiments, a transformed simulated seismic dataset may be formed by determining the instantaneous frequency of the plurality of time-domain simulated seismic traces. The instantaneous frequency of each observed seismic trace may be determined by solving equation (7) or equation (8).

In Step 512, in accordance with one or more embodiments, an objective function is formed based, at least in part, on the transformed simulated seismic dataset, the transformed observed seismic dataset. In accordance with some embodiments, the objective function may be based on a least-squares metric such as the one shown in equation (10). In accordance with other embodiments, the metric may be based on a cross-correlation function, a penalty-weighted cross-correlation, or an optimal transport function.

In Step 514, in accordance with one or more embodiments, an update to the seismic velocity model is determined based, at least in part, upon finding an extremum the objective function. The extremum may be a minimum or a maximum depending on the formulation of the objective function used. The determination of the extremum of the objective function, J, is described in more detail below in the context of FIG. 6.

In Step 516, an image of the subterranean region of interest may be formed in accordance with one or more embodiments. The image may be formed by numerically simulating the forward-propagation of seismic waves generated by the seismic source (106) at a plurality of locations through an updated seismic velocity model and numerically simulating the backward-propagation of seismic waves generated by an adjoint source at each of the plurality of seismic receivers (120) through an updated seismic velocity model. Further, the image may be formed by combining the forward-propagated seismic waves and the backward-propagated seismic waves at a plurality of positions within the subterranean region of interest using an imaging condition. In accordance with one or more embodiments, the imaging condition may be a zero-lag cross-correlation coefficient.

Figure 6:
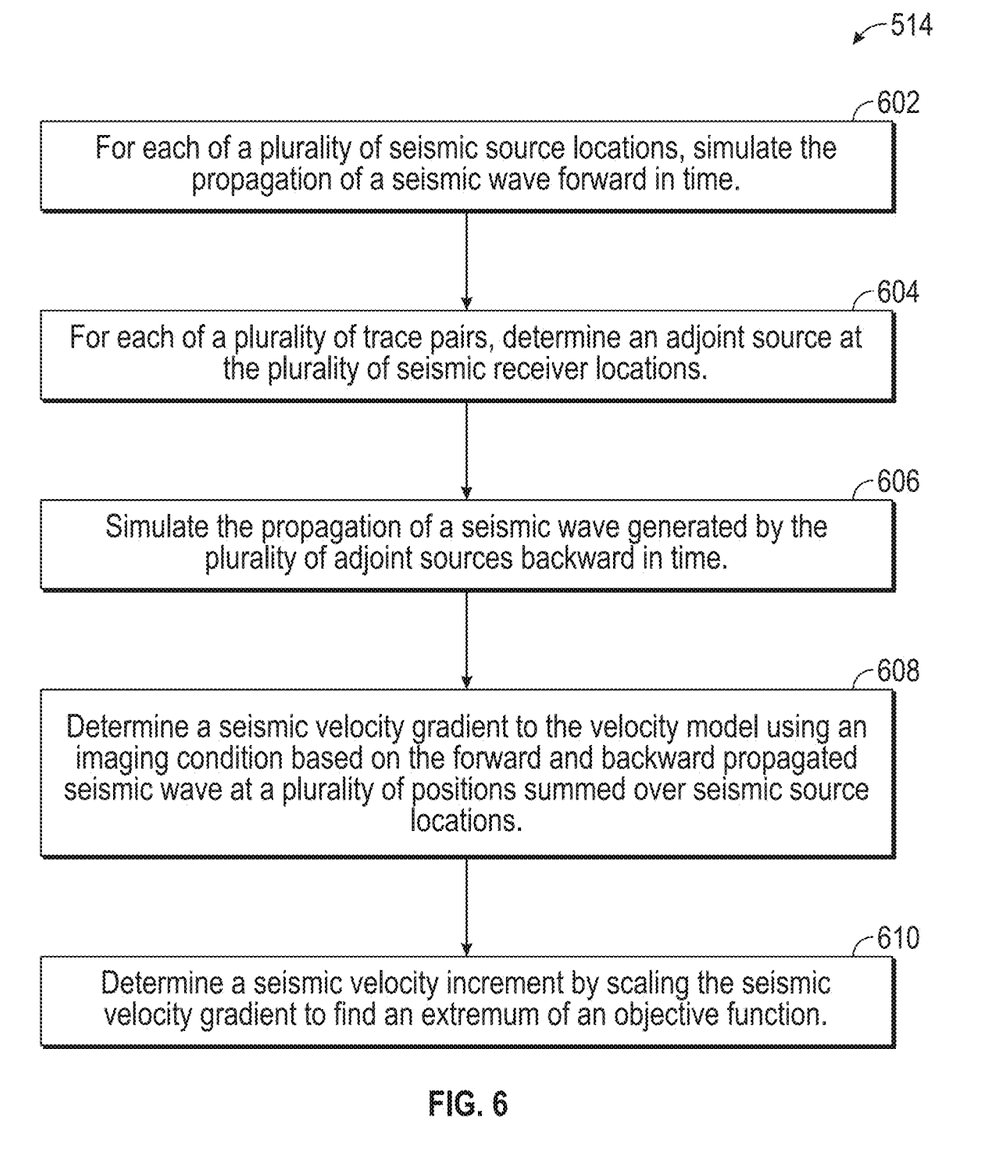
FIG. 6 shows a flowchart in accordance with one or more embodiments. in accordance with one or more embodiments.

FIG. 6 shows a flowchart for updating to the seismic velocity model, in accordance with one or more embodiments. FIG. 6 shows Step 514 of FIG. 5 in greater detail.

In Step 602, the seismic wave excited by the seismic source (106) at a plurality of seismic source location may be simulated propagating forward in time. The simulation may be based, at least in part, on solving the elastic wave equation or an approximation to the elastic wave equation for each of the seismic source locations sequentially.

In Step 604, the adjoint source for each member of the plurality of seismic trace pairs may be determined at the location of the seismic receiver corresponding to the trace pair. In accordance with one or more embodiments, the adjoint source may be based, at least in part, on the difference between a simulated seismic trace and an observed seismic trace. Further, the adjoint source may be determined using equation (6).

In Step 606 the seismic waves excited by the plurality of adjoint source may be simulated propagating backward in time. In accordance with one or more embodiment, the backward in time simulation may be performed sequentially for simulating the backward in time propagation of seismic waves from the observed seismic traces recorded for each firing of the seismic source (106) and simulating the forward in time propagation of seismic waves radiating from the seismic source. The image may be formed by combining the backward in time simulated wavefield with the forward in time simulated wavefield using an imaging condition. The imaging condition may be a cross-correlation imaging condition or a deconvolution imaging condition. The image formation methods described in this paragraph are examples of image formation methods that may be used. Other methods are well-known to one of ordinary skill in the art and the examples given in this paragraph should not be used to limit the scope of the invention.

In Step 608, a gradient of the seismic velocity model may be determined by applying an imaging condition combining the forward-propagated and backward-propagated simulated seismic waves at a plurality of positions in the subterranean region of interest. The seismic velocity gradient may be calculated by summing the contributions to seismic velocity gradient coming from each activation of the seismic source (106) at a plurality of locations.

In Step 610, in accordance with one or more embodiments, a seismic velocity increment may be determined by scaling the seismic velocity gradient to find an extremum of an objective function. In some embodiments, the extremum may be a maximum and in other embodiments the extremum may be a minimum. The scaling may include multiplication of the seismic velocity gradient by a scalar. The scaling may further include spatial smoothing and/or low-pass spatial filtering in one, two, or three spatial dimensions.

Figure 7A:
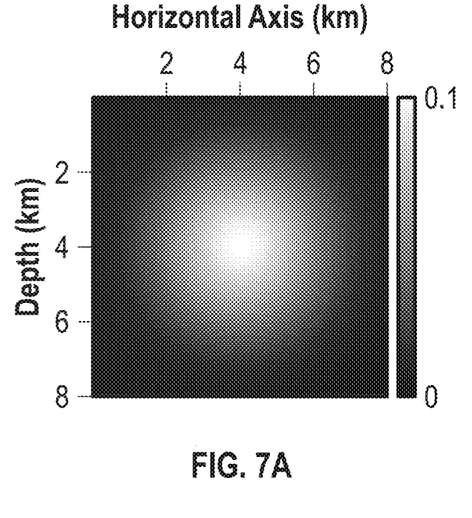
FIGS. 7A-7D show seismic velocity models in accordance with one or more embodiments.

FIGS. 7A-7D show the intermediate results of applying the workflow depicted in FIG. 5. To improve the pedagogical value of this example the observed seismic data is itself simulated numerically using a 2D numerical model of a subterranean region shown in FIG. 7A. The 2D seismic velocity model, shown in FIG. 7A, will be termed the "true seismic velocity model" throughout the description of FIGS. 7A-7D. The true seismic velocity model shown in FIG. 7A represents a vertical plane through the subsurface covering the range 0-8 km. The horizontal axis represents horizontal position covering the range of 0-8 km. The grayscale represents the perturbation of the seismic velocity from a uniform background seismic velocity of 4.0 km/s. This is a typical seismic velocity encountered in the subsurface. The perturbation is positive at every point in the subterranean region.

Figure 7B:
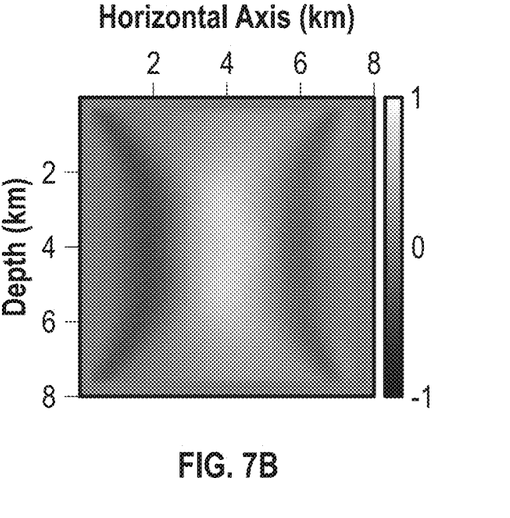

FIG. 7B shows the gradient of the conventional objective function determined using equation (9). The seismic velocity increment may be determined from the gradient by multiplying the gradient by a negative scalar. One of ordinary skill in the art will readily determine that the gradient has both positive and negative regions and thus, the seismic velocity increment determined from it also has negative and positive regions.

Figure 7C:
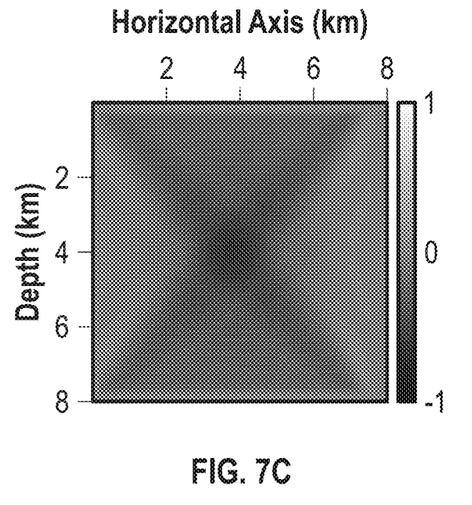

FIG. 7C shows the gradient determined, in accordance with one or more embodiments, using the conventional objective function determined using equation (10). Unlike the gradient of the conventional objective function shown in FIG. 7B the gradient shown in FIG. 7C is predominantly negative leading to a predominantly positive seismic velocity increment. Further, the gradient shown in FIG. 7C is much better focused than the gradient shown in FIG. 7B and correctly located at the position of the seismic velocity perturbation depicted in FIG. 7A.

Figure 7D:
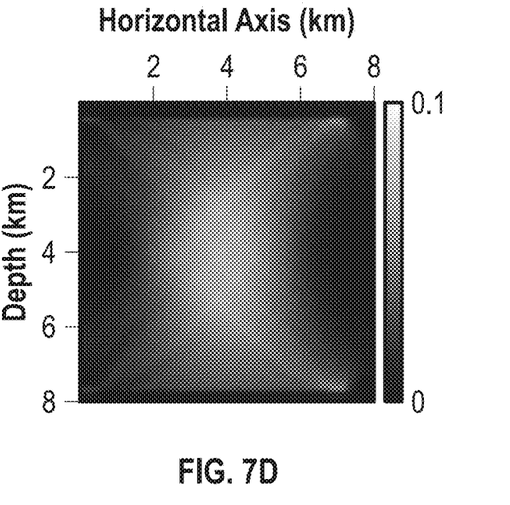

Finally, FIG. 7D shows the perturbation of the final updated seismic velocity model from the uniform background value of 4 km/s. One of ordinary skill in the art will readily appreciate that the sign of the update is everywhere in the subsurface the same as the sign of the perturbation from the uniform background in the true seismic velocity model. Further, the area of largest increase in the final updated seismic velocity model occurs in the center of the subterranean region where the perturbation from the uniform background occurs in the true velocity model.

Figure 8:
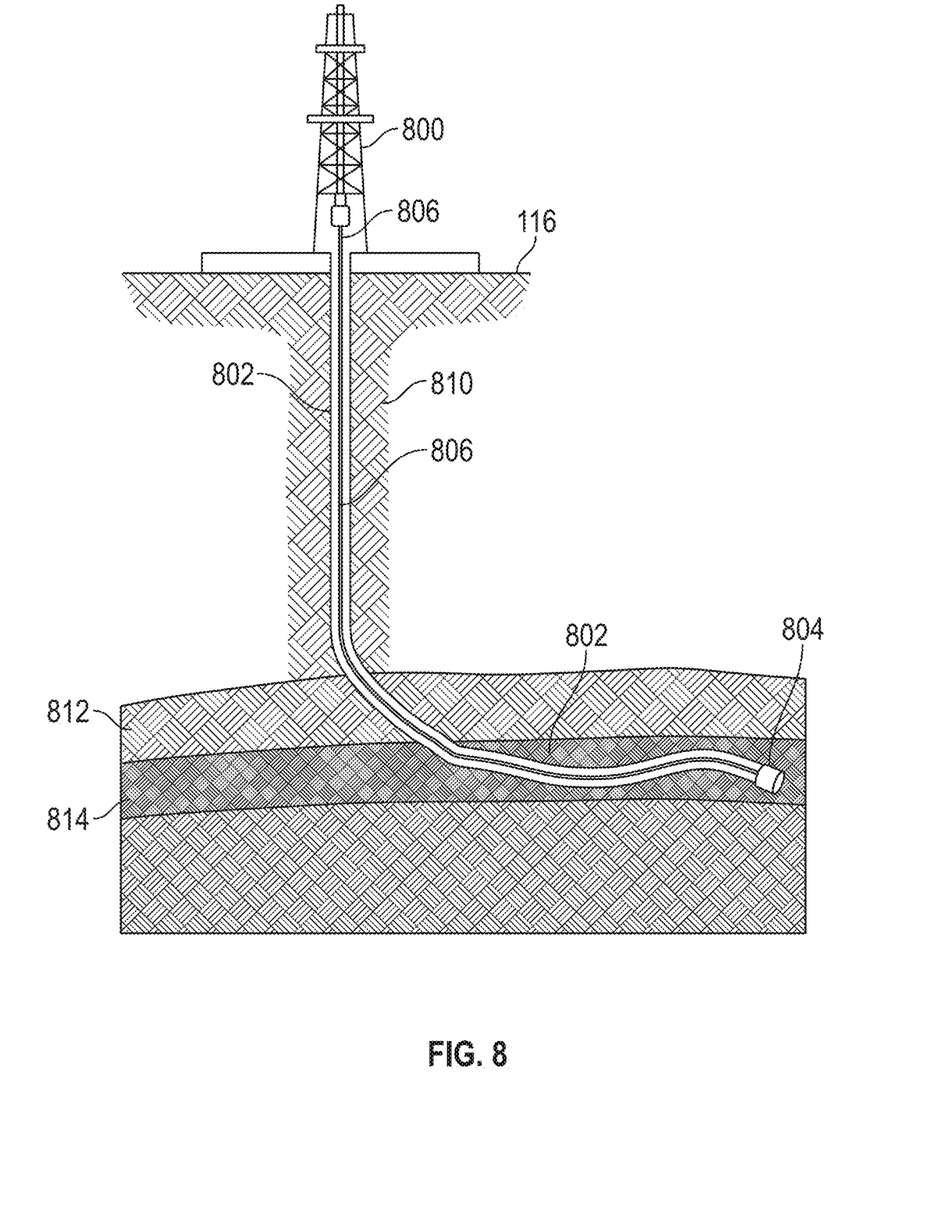
FIG. 8 shows systems in accordance with one or more embodiments.

FIG. 8 illustrates systems in accordance with one or more embodiments. As shown in FIG. 8, a well (802) may be drilled by a drill bit (804) attached by a drillstring (806) to a drill rig (808) located on the Earth's surface (116). The well may traverse a plurality of overburden layers (810) and one or more cap-rock layers (812) to a hydrocarbon reservoir (814). In accordance with one or more embodiments, the updated seismic velocity model, as shown in FIG. 7D, may be used to plan and perform the curved well path (806). An image of the subterranean region of interest may formed using the updated seismic velocity model and the observed seismic dataset and the curved well path (806) may be planned based, at least in part, on the image.

Figure 9:
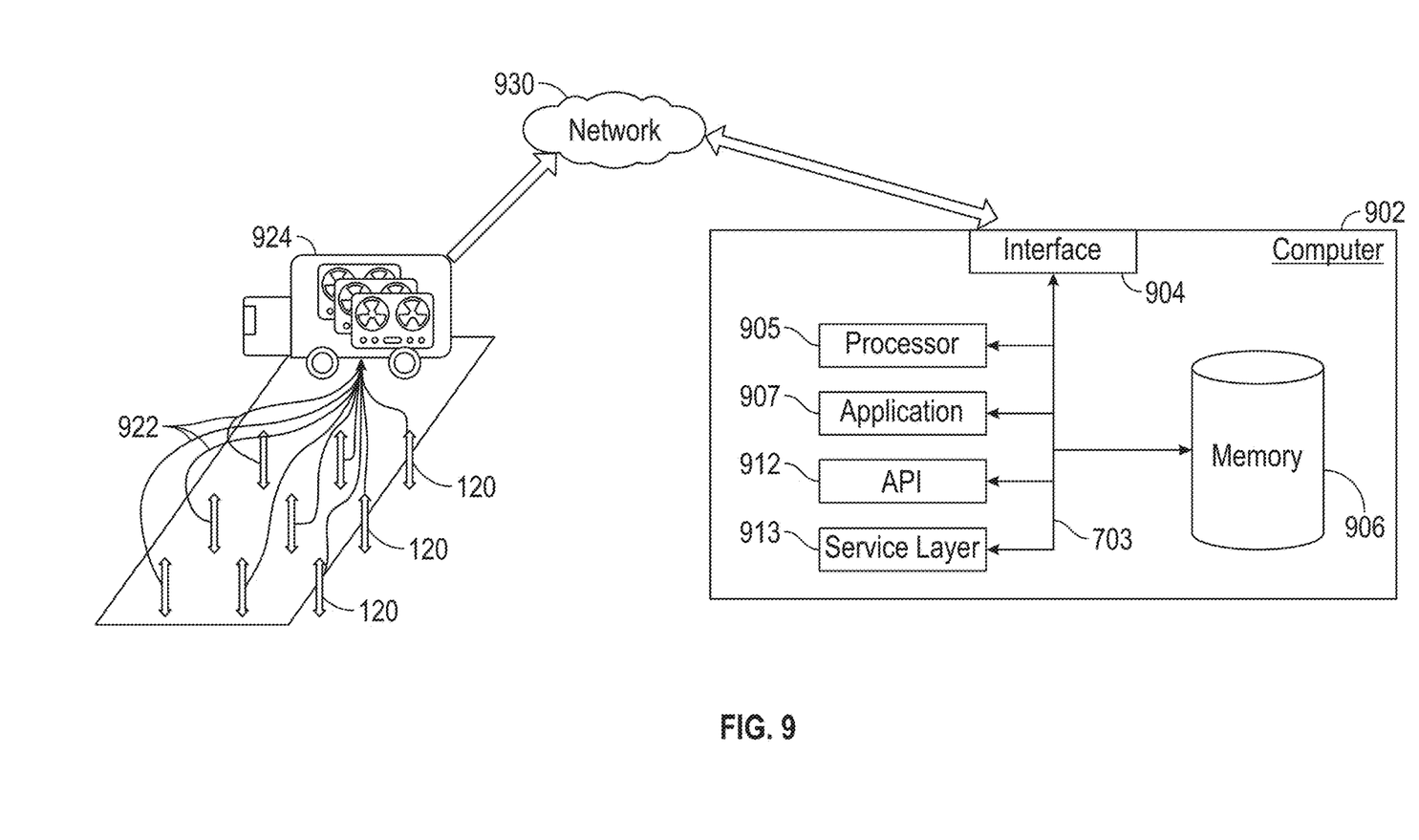
FIG. 9 shows a computer system in accordance with one or more embodiments.

FIG. 9 shows a seismic recording and processing system, in accordance with one or more embodiments. The data recorded by a plurality of seismic receivers (120) may be transmitted to a seismic recording facility (924) located in the neighborhood of the seismic survey (100). The seismic recording facility may be one or more seismic recording trucks (924). The plurality of seismic receivers (120) may be in digitally or analogic telecommunication with the seismic recording facility (924). The telecommunication may be performed over telemetry channels (922) that may be electrical cables, such as coaxial cables, or may be performed wireless using wireless systems, such as Wi-Fi or Bluetooth. Digitization of the seismic data may be performed at each seismic receiver (120), or at the seismic recording facility (924), or at an intermediate telemetry node (not shown) between the seismic receiver (120) and the seismic recording facility (924).

The seismic data may be recorded at the seismic recording facility (924) and stored on non-transitory computer memory. The computer memory may be one or more computer hard-drives, or one or more computer memory tapes, or any other convenient computer memory media familiar to one skilled in the art. The seismic data may be transmitted to a computer (902) for processing. The computer (902) may be located in or near the seismic recording facility (924) or may be located at a remote location, that may be in another city, country, or continent. The seismic data may be transmitted from the seismic recording facility (924) to a computer (902) for processing. The transmission may occur over a network (930) that may be a local area network using an ethernet or Wi-Fi system, or alternatively the network (930) may be a wide area network using an internet or intranet service. Alternatively, seismic data may be transmitted over a network (930) using satellite communication networks. Most commonly, because of its size, seismic data may be transmitted by physically transporting the computer memory, such as computer tapes or hard drives, in which the seismic data is stored from the seismic recording facility (902) to the location of the computer (902) to be used for processing.

FIG. 9 further depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of updating a seismic velocity model of a subterranean region of interest, comprising:
    receiving an observed seismic dataset for the subterranean region of interest comprising a plurality of observed seismic traces;
    receiving the seismic velocity model for the subterranean region of interest;
    generating, using a computer processor, a simulated seismic dataset comprising a plurality of simulated seismic traces based, at least in part, on the seismic velocity model and a geometry of the observed seismic dataset;
    determining, using the computer processor, a transformed observed seismic dataset, comprising:
        forming a first regularized estimate of a first instantaneous frequency of at least one member of the plurality of observed seismic traces,
            wherein the first regularized estimate is based, at least in part, on a first smoothing matrix, and
        determining the first instantaneous frequency based, at least in part, on the first regularized estimate;
    determining, using the computer processor, a transformed simulated seismic dataset, comprising:
        determining a second instantaneous frequency of at least one member of the plurality of simulated seismic traces;
    forming, using the computer processor, an objective function based, at least in part, on the transformed observed seismic dataset and the transformed simulated seismic dataset; and
    determining, using the computer processor, an updated seismic velocity model based, at least in part, upon finding an extremum of the objective function.

2. The method of claim 1, further comprising:
    forming, using the computer processor, an image of the subterranean region of interest based, at least in part, on the updated seismic velocity model;
    identifying a portion of the subterranean region of interest with a high likelihood of containing hydrocarbons based, at least in part, on the image of the subterranean region of interest;
    determining a well path through the subterranean region of interest based, at least in part, on the identified portion of the subterranean region of interest; and
    performing the well path using a drilling system.

3. The method of claim 1, wherein the objective function comprises a least-squares objective function.

4. The method of claim 1, wherein the objective function comprises a penalized cross-correlation objective function.

5. The method of claim 1, wherein the seismic velocity model comprises an elastic seismic velocity model.

6. The method of claim 1, wherein the seismic velocity model comprises an anisotropic seismic velocity model.

7. The method of claim 1, wherein determining the updated seismic velocity model comprises:
    determining an adjoint source for each of a plurality of seismic receiver locations based, at least in part, on the observed seismic dataset and the simulated seismic dataset;

simulating, for each of a plurality of seismic source locations and the plurality of seismic receiver locations, propagation of a seismic wave generated by the adjoint source backward in time;

simulating, for each of the plurality of seismic source locations, propagation of a seismic wave forward in time;

determining a seismic velocity gradient using an imaging condition based, at least in part, on the simulated seismic wave propagated forward in time and the simulated seismic wave propagated backward in time;

determining a seismic velocity increment model by scaling the seismic velocity gradient based, at least in part, on the extremum of the objective function; and updating the seismic velocity model based, at least in part, on the seismic velocity increment model.

8. A non-transitory computer readable medium storing instructions executable by a computer processor, the instructions comprising functionality for:

receiving an observed seismic dataset for a subterranean region of interest comprising a plurality of observed seismic traces;

receiving a seismic velocity model for the subterranean region of interest;

generating a simulated seismic dataset comprising a plurality of simulated seismic traces based, at least in part, on the seismic velocity model and a geometry of the observed seismic dataset;

determining a transformed observed seismic dataset comprising:

forming a first regularized estimate of a first instantaneous frequency of at least one member of the plurality of observed seismic traces,
wherein the first regularized estimate is based, at least in part, on a first smoothing matrix, and
determining the first instantaneous frequency based, at least in part, on the first regularized estimate;

determining a transformed simulated seismic dataset comprising:
determining a second instantaneous frequency of at least one member of the plurality of simulated seismic traces;

forming an objective function based, at least in part, on the transformed observed seismic dataset and the transformed simulated seismic dataset; and determining, using the computer processor, an updated seismic velocity model based, at least in part, upon finding an extremum of the objective function.

9. The non-transitory computer readable medium of claim 8, further comprising:

forming an image of the subterranean region of interest based, at least in part, on the updated seismic velocity model;

identifying a portion of the subterranean region of interest with a high likelihood of containing hydrocarbons based, at least in part, on the image of the subterranean region of interest; and determining a well path through the subterranean region of interest based, at least in part, on the identified portion of the subterranean region of interest.

10. The non-transitory computer readable medium of claim 8, wherein the objective function comprises an optimal transport objective function.

11. The non-transitory computer readable medium of claim 8, wherein determining the second instantaneous frequency comprises:

forming a second regularized estimate of the second instantaneous frequency of at least one member of the plurality of simulated seismic traces,
wherein the second regularized estimate is based, at least in part, on a second smoothing matrix; and
determining the second instantaneous frequency based, at least in part, on the second regularized estimate.

12. The non-transitory computer readable medium of claim 8, wherein the seismic velocity model comprises an elastic seismic velocity model.

13. The non-transitory computer readable medium of claim 8, wherein the seismic velocity model comprises an anisotropic seismic velocity model.

14. The non-transitory computer readable medium of claim 8, wherein determining the updated seismic velocity model comprises:

determining an adjoint source for each of a plurality of seismic receiver locations based, at least in part, on the observed seismic dataset and the simulated seismic dataset;

simulating, for each of a plurality of seismic source locations and the plurality of seismic receiver locations, propagation of a seismic wave generated by the adjoint source backward in time;

simulating, for each of the plurality of seismic source locations, propagation of a seismic wave forward in time;

determining a seismic velocity gradient using an imaging condition based, at least in part, on the seismic wave propagated forward in time and the seismic wave propagated backward in time;

determining a seismic velocity increment model by scaling the seismic velocity gradient based, at least in part, on the extremum of the objective function; and updating the seismic velocity model based, at least in part, on the seismic velocity increment model.

15. A system for forming an image of a subterranean region of interest, comprising:

a seismic source to emit a radiated seismic wave;

a plurality of seismic receivers for detecting and recording an observed seismic dataset generated by the radiated seismic wave; and a seismic processor configured to:
receive the observed seismic dataset for the subterranean region of interest comprising a plurality of observed seismic traces;
receive a seismic velocity model for the subterranean region of interest;
generate a simulated seismic dataset comprising a plurality of simulated seismic traces based, at least in part, on the seismic velocity model and a geometry of the observed seismic dataset;
determine a transformed observed seismic dataset comprising:
form a first regularized estimate of a first instantaneous frequency of at least one member of the plurality of observed seismic traces,
wherein the first regularized estimate is based, at least in part, on a first smoothing matrix; and
determine the first instantaneous frequency based, at least in part, on the first regularized estimate,
determine a transformed simulated seismic dataset comprising:
determining a second instantaneous frequency of at least one member of the plurality of simulated seismic traces;

form an objective function based, at least in part, on the transformed observed seismic dataset and on the transformed simulated seismic dataset; and determine an updated seismic velocity model based, at least in part, upon finding an extremum of the objective function; and form the image of the subterranean region of interest based, at least in part, on the updated seismic velocity model.

16. The system of claim 15, wherein the objective function comprises a least-squares objective function.

17. The system of claim 15, wherein the objective function comprises a penalized cross-correlation objective function.

18. The system of claim 15, wherein the seismic velocity model comprises an elastic seismic velocity model.

19. The system of claim 15, wherein the seismic velocity model comprises an anisotropic seismic velocity model.

20. The system of claim 15, wherein determining the updated seismic velocity model, comprises:

determining an adjoint source for each of a plurality of seismic receiver locations based, at least in part, on the observed seismic dataset and the simulated seismic dataset;

simulating, for each of a plurality of seismic source locations and the plurality of seismic receiver locations, propagation of a seismic wave generated by the adjoint source backward in time;

simulating, for each of the plurality of seismic source locations, propagation of a seismic wave forward in time;

determining a seismic velocity gradient using an imaging condition based, at least in part, on the seismic wave propagated forward in time and the seismic wave propagated backward in time;

determining a seismic velocity increment model by scaling the seismic velocity gradient based, at least in part, on the extremum of the objective function; and updating the seismic velocity model based, at least in part, on the seismic velocity increment model.

* * * * *